US009780600B2

(12) United States Patent
Sentosa et al.

(10) Patent No.: US 9,780,600 B2
(45) Date of Patent: Oct. 3, 2017

(54) METHOD AND APPARATUS FOR WIRELESSLY RECHARGING BATTERIES

(71) Applicant: Superior Communications, Inc., Irwindale, CA (US)

(72) Inventors: Samuel Sentosa, Chino, CA (US); David P. Su, Montebello, CA (US); George Chen, Chatsworth, CA (US)

(73) Assignee: SUPERIOR COMMUNICATIONS, INC., Irwindale, CA (US)

( * ) Notice: Subject to any disclaimer, the term of this patent is extended or adjusted under 35 U.S.C. 154(b) by 224 days.

(21) Appl. No.: 14/754,333

(22) Filed: Jun. 29, 2015

(65) Prior Publication Data
US 2015/0380977 A1 Dec. 31, 2015

Related U.S. Application Data

(60) Provisional application No. 62/018,167, filed on Jun. 27, 2014.

(51) Int. Cl.
H02J 7/04 (2006.01)
H02J 7/00 (2006.01)
(52) U.S. Cl.
CPC .......... H02J 7/042 (2013.01); H02J 7/0032 (2013.01)

(58) Field of Classification Search
CPC ........ H02J 7/025; H01F 38/14; Y02T 90/122; B60L 11/182; Y02E 60/12
USPC ........................................... 320/108
See application file for complete search history.

(56) References Cited

U.S. PATENT DOCUMENTS

| 2004/0145343 | A1* | 7/2004 | Naskali | H02J 7/0027 320/108 |
| 2007/0279002 | A1* | 12/2007 | Partovi | H02J 7/0027 320/115 |
| 2009/0098750 | A1* | 4/2009 | Randall | G06F 1/1616 439/77 |
| 2013/0134931 | A1* | 5/2013 | Tomiki | H04B 5/0037 320/108 |

* cited by examiner

Primary Examiner — Arun Williams
(74) Attorney, Agent, or Firm — Snell & Wilmer L.L.P.

(57) ABSTRACT

A wireless charging unit for a mobile device unit. The wireless charging unit may include an interface surface for the mobile device unit to be positioned upon, and a power transmitter device configured to transmit power wirelessly to the mobile device unit when the mobile device unit is positioned upon the interface surface to charge the mobile device unit. A switch may be electrically coupled to a power connector plug and configured to disable reception of power by the power connector plug from a power outlet in response to a sensor circuit detecting that the mobile device unit has been removed from the interface surface to a distance.

17 Claims, 12 Drawing Sheets

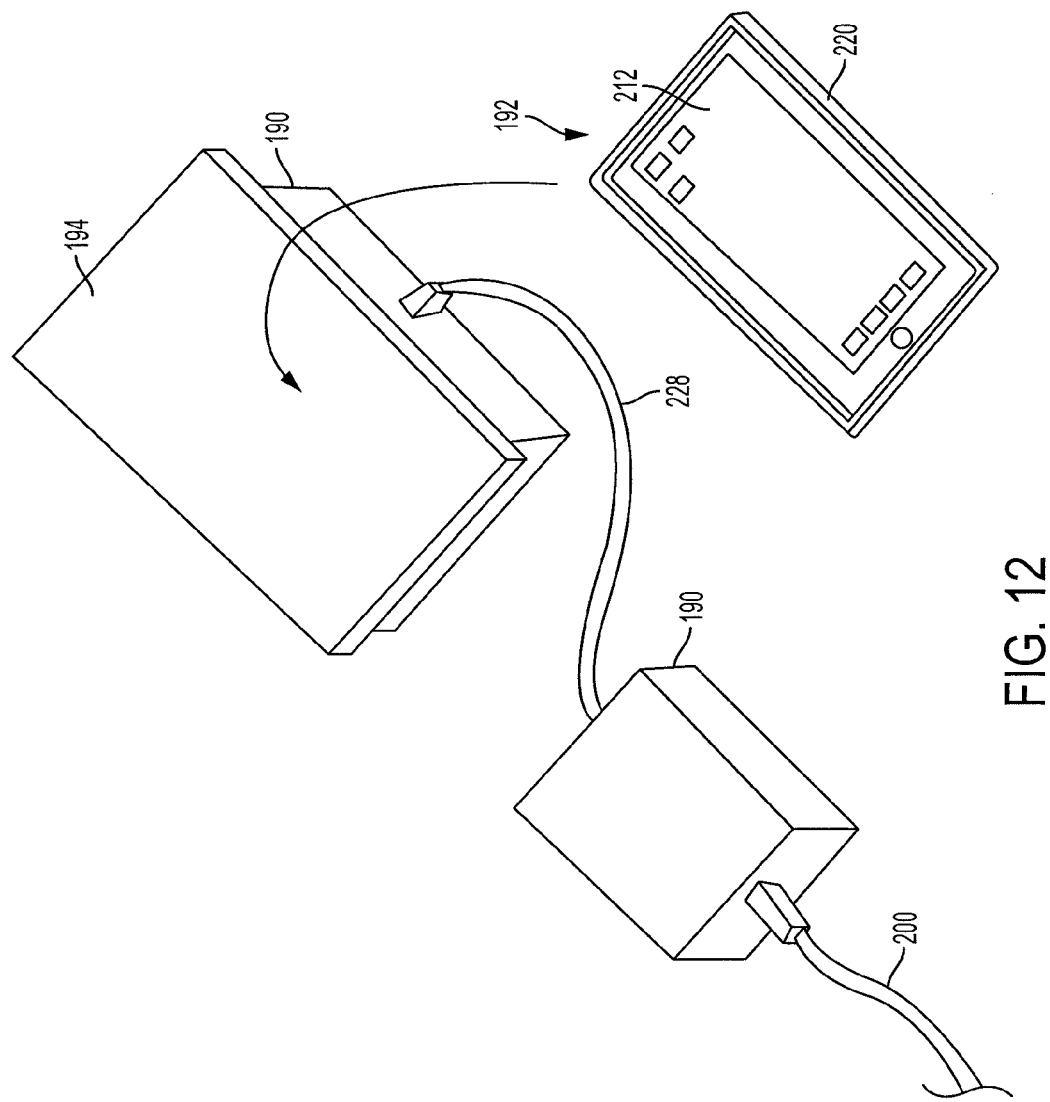

US 9,780,600 B2

METHOD AND APPARATUS FOR WIRELESSLY RECHARGING BATTERIES

RELATED APPLICATIONS

The present application claims the benefit of U.S. Provisional Application No. 62/018,167, filed Jun. 27, 2014, the entire disclosure of which is incorporated herein by reference.

BACKGROUND

Field of the Invention

The present invention relates to a method and apparatus for wirelessly charging the battery of a mobile device and for optimizing the operational and down time of a wireless charging unit.

Description of the Related Art

A wireless charging unit may remain on for extended periods of time even though no charging is desired by a mobile device such as a mobile phone. The mobile device may already be fully charged, or the mobile device may simply be nowhere near the wireless charging unit. In addition to wasted energy involved in the production of an unused wireless charging field, the charging unit itself may draw a large amount of energy. Users often rapidly lift the mobile device on and off of a wireless charging interface, and often forget to plug or unplug the wireless charging unit. Considering the number of wireless charging units present, this translates into a large amount of wasted energy and a negative effect on the environment.

Thus, there is a need for a method and apparatus for optimizing the operational and down time of a wireless charging unit.

SUMMARY

In one embodiment, the present invention includes a method and apparatus for optimizing the operational and down time of a wireless charging unit.

In one embodiment, a wireless charging unit for a mobile device unit may include an interface surface for the mobile device unit to be positioned upon. A power transmitter device may be configured to transmit power wirelessly to the mobile device unit when the mobile device unit is positioned upon the interface surface to charge the mobile device unit. A power connector plug may be configured to receive power from a power outlet for powering the power transmitter device. A sensor circuit may be configured to detect that the mobile device unit has been removed from the interface surface to a distance away from the interface surface. A switch may be electrically coupled to the power connector plug and configured to disable reception of power by the power connector plug from the power outlet in response to the sensor circuit detecting that the mobile device unit has been removed from the interface surface to the distance.

In one embodiment, a system for wirelessly charging a mobile device may include a power receiver device configured to couple to the mobile device and receive power wirelessly for charging the mobile device. An interface surface may be included for the power receiver device to be positioned upon. A power transmitter device may be configured to transmit power wirelessly to the power receiver device when the power receiver device is positioned upon the interface surface. A power connector plug may be configured to receive power from a power outlet for powering the power transmitter device. A sensor circuit may be configured to detect that the mobile device has been removed from the interface surface to a distance away from the interface surface. A switch may be electrically coupled to the power connector plug and configured to disable reception of power by the power connector plug from the power outlet in response to the sensor circuit detecting that the mobile device has been removed from the interface surface to the distance.

In one embodiment, a method for wirelessly charging a mobile device unit may include positioning a mobile device unit on an interface surface of a wireless charging unit. The method may include charging the mobile device unit wirelessly using a power transmission device of the wireless charging unit, the power transmission device receiving power for charging the mobile device unit from a power source positioned exterior to the wireless charging unit. The method may include removing the mobile device unit from the interface surface to a distance. The method may include automatically disabling the wireless charging unit from receiving power from the power source in response to the mobile device unit being removed from the interface surface to the distance.

BRIEF DESCRIPTION OF THE DRAWINGS

The features, obstacles, and advantages of the present disclosure will become more apparent from the detailed description set forth below when taken in conjunction with the drawings, wherein:

FIG. 12 is a perspective view of a system for wireless charging according to an embodiment of the present disclosure.

DETAILED DESCRIPTION

Apparatus, systems and methods that implement the embodiments of the various features of the present disclosure will now be described with reference to the drawings. The drawings and the associated descriptions are provided to illustrate some embodiments of the present disclosure and not to limit the scope of the present disclosure. Throughout the drawings, reference numbers are re-used to indicate correspondence between referenced elements.

In certain embodiments, the embodiments and features discussed in regard to FIGS. 1-8 may be modified as discussed herein to be utilized in an embodiment of a wireless charging unit. The embodiments and features discussed in regard to FIGS. 1-8 may be found in disclosures of U.S. application Ser. No. 14/182,127, filed Feb. 17, 2014, now U.S. Pat. No. 8,836,282, and U.S. application Ser. No. 13/649,004, filed Oct. 10, 2012, now U.S. Pat. No. 8,653, 789, and U.S. application Ser. No. 12/607,946, filed Oct. 28, 2009, the entirety of which are each incorporated by reference herein.

Figure 1:
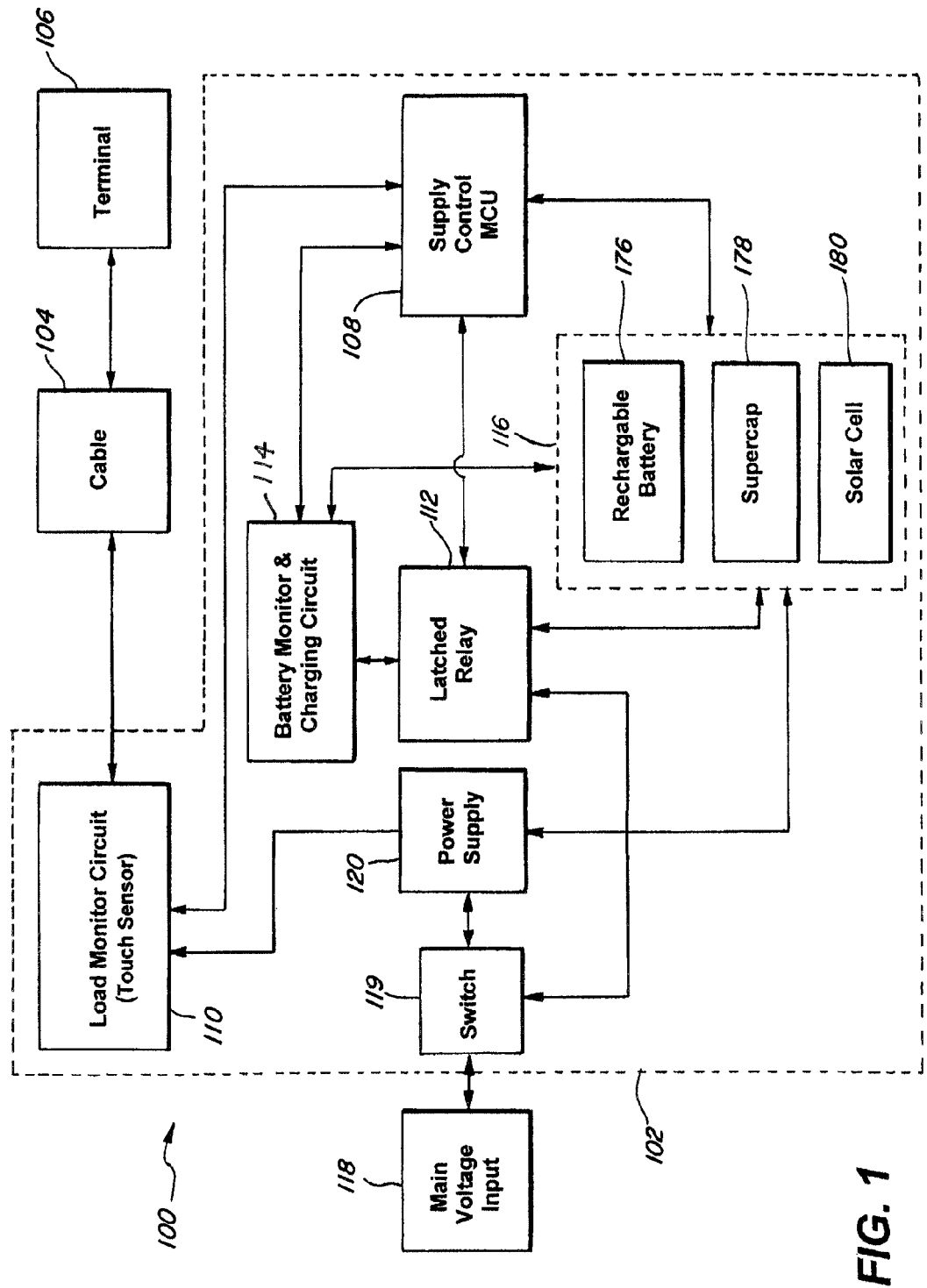
FIG. 1 is a block diagram of a battery charger according to an embodiment of the present disclosure.
Figure 2:
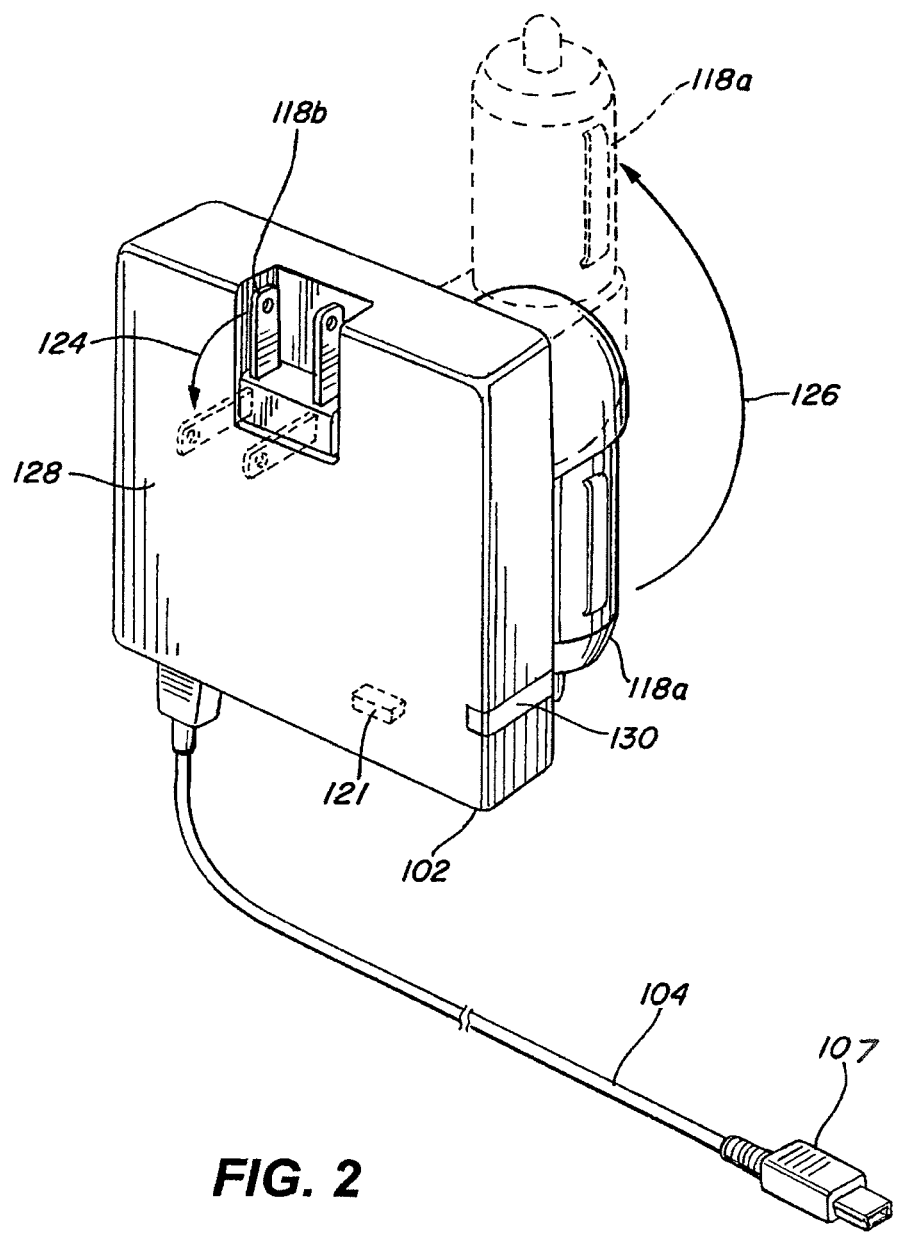
FIG. 2 is a perspective view of a battery charger according to an embodiment of the present disclosure.

FIG. 1 is a block diagram of a battery charger 100, while FIG. 2 is a perspective view of the battery charger. The battery charger 100 includes, for example, a converter unit 102, a cable 104, a terminal 106, and/or a main voltage input 118.

The terminal 106 is connected to the cable 104 and can be an electronic device. The terminal 106 can be, for example, a music player, a cell phone, a laptop, a desktop computer, a personal digital assistant (PDA), a camera, or any other type of electronic device which includes a rechargeable battery. In one embodiment, the converter unit 102 transmits power from the cable 104 to charge the terminal 106.

The cable 104 is connected to the converter unit 102 and the terminal 106. The cable 104 transmits power and/or information between the converter unit 102 and the terminal 106. The cable 104 can be any type of cable that can transmit power and/or information between the converter unit 102 and the terminal 106. The terminal 106 can be connected to the cable 104 using a terminal adapter 107 (FIG. 2). The terminal adapter 107 can be, for example, a universal serial bus (USB) adapter, an IEEE 1394 interface, a proprietary adapter specific to a terminal, or any other type of adaptor that can be used to charge the rechargeable battery in the terminal.

Figure 3:
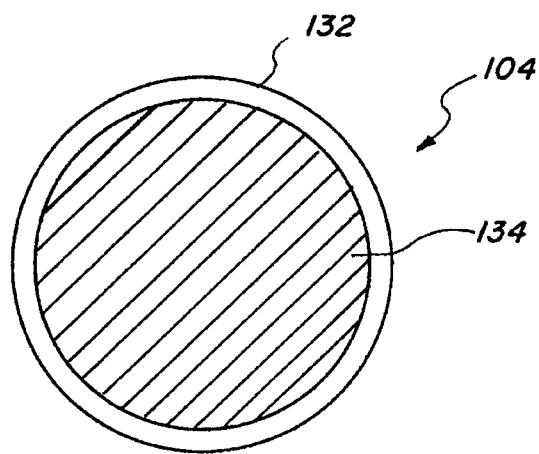
FIG. 3 is a sliced view of a cable according to an embodiment of the present disclosure.

FIG. 3 depicts the cable 104 at a plane perpendicular to an axial direction of the cable 104. As seen in FIG. 3, the cable 104 includes an outer shell 132 and a conductive material 134. The outer shell 132 can be formed, in part, from an insulating material such as plastic or rubber or any other type of insulating material. The conductive material 134 can be, for example, a copper based wire or any other type of conductive material. The conductive material 134 can transmit the power and/or information between the converter unit 102 and the terminal 106, while the outer shell 132 can insulate the conductive material 134 from outside elements.

The cable 104 can also have a capacitance, which will increase, for example, when a user touches or is touching the cable 104. The capacitance can be, for example, a capacitance of the outer shell 132. Thus, if a user touches the outer shell 132, for example, with two fingers, the capacitance of the outer shell 132 can increase. When the user touches the outer shell 132, a small current can flow through the user, increasing the capacitance of the outer shell 132. The capacitance of the cable 104 can be used, for example, to determine whether the terminal 106 is connected to the converter unit 102, which will be described later. Although FIG. 1 and FIG. 2 depict the use of the cable 104, the terminal 106 can also connect directly to the converter unit 102.

The main voltage input 118 is connected to the converter unit 102 and is connectable to an external power source. The main voltage input 118 can be, for example, a variety of power inputs such as a DC plug 118*a* and/or an AC plug 118*b*. The main voltage input 118 can be connected to an external power source and draw power from the external power source. The main voltage input 118 can also be any type of power connector that can receive power from the external power source. For example, the DC plug 118*a* can be connected to a DC outlet, such as a 12 V DC outlet, in an automobile. The AC plug 118*b*, for example, can be connected to an electrical socket, such as a 110 V or 120 V socket, in a conventional house. Although the main voltage input 118 includes the AC plug 118*a* and the DC plug 118*b*, the main voltage input 118 can include any number of power connectors.

The DC plug 118*a* and the AC plug 118*b* can also be placed in various positions depending on whether each of the components is in a storage mode or an active mode. This allows for the compact storage of the battery charger 100 when not in use, but allows the battery charger 100 to retain its functionality when it is ready for use.

The DC plug 118*a* can remain in a first position, such as a stored position, when the DC plug 118*a* is not in use and in a storage mode. The DC plug 118*a* can rotate in a direction 126 to a second position, such as an active position, when ready for use and in the active mode. Likewise, the AC plug 118*b* can remain in a first position, such as a stored position, when not in use and in a storage mode. The AC plug 118*b* can, for example, rotate in a direction 124 to a second position, such as an active position, when ready for use and in the active mode.

The converter unit 102 is connected to the cable 104 and/or the terminal 106. The converter unit 102 can also be directly connected to the terminal 106 without the cable 104. As seen in FIG. 1, the converter unit 102 includes a microcontroller 108, a load monitor circuit 110, a latched relay 112, a battery monitor and charging circuit 114, a battery 116, and a power supply 120.

The load monitor circuit 110 is connectable to the terminal 106 either directly or through the cable 104. The load monitor circuit 110 is also electrically connected to the microcontroller 108, and/or the power supply 120. The load monitor circuit 110 can include a sensor. The sensor can detect whether the terminal 106 is electrically connected to the converter unit 102. For example, the sensor can detect whether the terminal 106 is electrically connected to the load monitor circuit 110.

In one embodiment, to detect whether the terminal 106 is electrically connected to the battery charger 100, the sensor detects a capacitance of the terminal 106. For example, when a mobile phone is connected to the load monitor circuit, there will be an increase in capacitance.

In another embodiment, the sensor can detect whether the terminal 106 is electrically connected to the load monitor circuit 110 by detecting a capacitance increase in the cable 104. The capacitance increase can be caused, for example, by a user touching the cable 104. When the user touches the cable 104, it is likely that the user is connecting the terminal 106 to the battery charger 100 through, for example, the cable 104. This can indicate that the terminal 106 will be electrically connected to the load monitor circuit 110.

The power supply 120 is connected to the main voltage input 118 and/or the load monitor circuit 110. The power supply 120 is connected to the main voltage input 118 through a switch 119. The switch 119 can be connected or disconnected. When the switch 119 is disconnected, no power flows from the main voltage input 118 to the power supply 120. When the switch 119 is connected, power flows from the main voltage input 118 to the power supply 120.

The power supply 120 can supply power to the load monitor circuit 110 and/or the terminal 106 when the switch 119 is connected.

The battery 116 is electrically connected to the latched relay 112, the microcontroller 108, and/or the power supply 120. The battery 116 can also be electrically connected to the terminal 106, for example, through the microcontroller 108 and/or the power supply 120. The battery 116 can supply power to the microcontroller 108 and/or the terminal 106.

The battery 116 can be charged by the external power source when the switch 119 is connected and when the latched relay 112 enables power to flow to the battery 116. When the switch 119 is disconnected, and/or the latched relay 112 disables power from flowing to the battery 116, the battery 116 does not receive power from the external power source. The battery 116 can include, for example, a rechargeable battery 176, a super capacitor ("supercap") 178, and/or a solar cell 180. The battery 116 can also include any other type of energy storage or renewable energy device which can be used to power the microcontroller 108 and/or the terminal 106. In one embodiment, the battery 116 can have an unlimited shelf life. Thus, the battery 116 can operate and hold for the life of the battery charger 100. Therefore, the battery 116 does not need to be replaced.

The battery monitor and charging circuit 114 is electrically connected to the latched relay 112, the microcontroller 108, and/or the battery 116. The battery monitor and charging circuit 114 can monitor an energy level of the battery 116.

The latched relay 112 is electrically connected to the switch 119, the battery 116, and/or the battery monitor and charging circuit 114. In one embodiment, the switch 119 can be part of the latched relay 112. The latched relay 112 can connect or disconnect the switch 119. When the switch 119 is disconnected, no power flows from the external power source through the main voltage input 118 to the power supply 120. When the switch 119 is connected, power can flow from the external power source through the main voltage input 118 to the power supply 120.

In one embodiment, when the switch 119 is disconnected, the terminal 106 is not charged. This is beneficial, for example, when the terminal 106 is already fully charged. In such a case, energy is prevented from being wasted by discontinuing the current flow from the external power source. The switch 119 can be positioned, for example, between the main voltage input and any component that creates a loading, such as the power supply 120. This allows the switch 119 to discontinue the current flow from the external power source to the terminal 106.

The latched relay 112 is electrically connected to the main voltage input 118, the power supply 120, the battery 116, the battery monitor and charging circuit 114, and/or the microcontroller 108. The latched relay 112 is also electrically connected to the switch 119. The latched relay 112 can connect or disconnect the switch 119 based on instructions from the microcontroller 108. The latched relay 112 can also enable or disable the supply of power to the battery 116 based on the instructions of the microcontroller 108.

The microcontroller 108 is electrically connected to the load monitor circuit 110, the battery monitor and charging circuit 114, the latched relay 112, and/or the battery 116. The microcontroller 108 can receive power from the external power source and/or the battery 116. For example, when the switch 119 is disconnected and the converter unit 100 does not receive power from the external power source, the battery 116 can supply power to the microcontroller 108. This allows the microcontroller 108 to operate even when the external power source is not supplying power to the converter unit 100. The microcontroller 108 receives information regarding the energy level of the battery 116 from the battery monitor and charging circuit 114. When the energy level of the battery 116 is below a predetermined energy level threshold, the battery 116 instructs the latched relay 112 to supply power to the battery 116. This guarantees that the microcontroller 108 will always have enough power to operate, even when the converter unit 102 is conserving energy by not drawing power from the external power source.

The microcontroller 108 can also detect a power disablement condition and a power enablement condition. During a power disablement condition, the microcontroller 108 instructs the latched relay 112 to disconnect the switch 119. By disconnecting the switch 119, power does not flow from the main voltage input 118 to the power supply 120, and the converter unit 102 ceases drawing power from the external power supply. This saves power since much of the power that is drawn by a battery charger during a power disablement condition is wasted.

The power disablement condition can be, for example, when the terminal 106 is electrically connected to the converter unit 102 and is fully charged. Thus, the microcontroller 108 can receive a signal from the load monitor circuit 110 indicating that the terminal 106 is connected to the converter unit 102. The microcontroller 108 can then detect a voltage and/or current of the terminal 106.

In one embodiment, when the voltage of the terminal 106 exceeds a predetermined voltage threshold, then the terminal 106 is fully charged. For example, if the voltage of the terminal 106 is 21 volts, and the predetermined voltage threshold is 20 volts, then the terminal 106 is fully charged. In another embodiment, when the current of the terminal 106 is below a predetermined current threshold, then the terminal 106 is fully charged. For example, if the current of the terminal 106 is 50 mA and the predetermined current threshold is 60 mA, then the terminal 106 is fully charged.

When the power disablement condition is detected, the microcontroller 108 instructs the latched relay 112 to disconnect the switch 119. Once the switch 119 is disconnected, the converter unit 102 ceases drawing power from the external power source, reducing energy consumption. Thus, the battery charger 100 does not draw power from the external power source, even when the battery charger 100 is connected to the external power source. However, if the voltage of the terminal 106 is 18 volts, and/or the current of the terminal 106 is 70 mA, then the terminal 106 is not fully charged, and there is no power disablement condition.

The power disablement condition can also be, for example, when a charge time of the terminal 106 exceeds a predetermined charge time threshold. The microcontroller 108 can also determine that the terminal 106 is fully charged based on the charge time. In one embodiment, the charge time can begin, for example, when the terminal 106 is initially connected to the converter unit 102. In another embodiment, the charge time can begin when the voltage of the terminal 106 remains stagnant for a predetermined period of time. By remaining stagnant for a predetermined period of time, the terminal 106 may be fully charged, even if the voltage does not exceed the predetermined voltage threshold. When the charge time begins, however, can be appropriately determined based on the terminal 106 or any other criteria. Once the charge time exceeds the predetermined charge time threshold, the microcontroller 108 instructs the latched relay 112 to disconnect the switch 119. This enables power conservation by preventing the converter unit 102 from drawing power when the terminal 106 is already full, nearly full, or has already been charged for an appropriate amount of time. Thus, even if the battery charger 100 is connected to the external power source, it does not draw power from the external power source.

The power disablement condition can also be, for example, when the terminal 106 is disconnected from the converter unit 102 and/or the battery charger 100. Thus, when the load monitor circuit 110 sends a signal to the microcontroller 108 that the terminal 106 is disconnected from the converter unit 102, the microcontroller 108 sends a signal to the latched relay 112 to disconnect the switch 119. This disables power reception by the battery charger 100 from the external power source even if the battery charger 100 is connected to the external power source.

In power disablement situations, power consumption by the converter unit 102 and/or the battery charger 100 does not perform any meaningful function, such as by charging a terminal 106, since the terminal 106 is already fully charged or disconnected from the converter unit 102 and/or the battery charger 100. Thus, by ceasing drawing power from the external power source in power disablement situations, power consumption of the converter unit 102 and/or the battery charger 100 can be reduced and efficiency of the converter unit 102 can be increased. For example, the user may not notice that the terminal 106 is fully charged. This is especially prevalent where the user is, for example, charging the terminal 106 overnight while the user is sleeping.

The power enablement condition can be, for example, when the terminal 106 is initially connected to the converter unit 102 and/or the battery charger 100. During the power enablement condition, the microcontroller 108 sends the signal to the latched relay 112 that the switch 119 should be connected. This can, for example, allow the converter unit 102 to draw power from the external power source and to charge the terminal 106.

In one embodiment, the power enablement condition can last for a predetermined time period even when the power disablement condition occurs. For example, if the electronic charger is fully charged when initially connected to the battery charger 100, the battery charger 100 can still enable power from the external power source for the predetermined time period. During the predetermined time period, the microcontroller 108 can, for example, determine whether the terminal 106 is full. In another embodiment, during the predetermined time period, the microcontroller 108 can determine if the disablement condition occurs and proceed with actions associated with the disablement condition after the predetermined time period has elapsed.

In another embodiment, the converter unit 102 can periodically wake up from the power disablement condition to monitor the terminal 106. The converter unit 102 can determine whether the power disablement condition still exists and whether to continue disabling power reception from an external power source or disabling the supply of power to the terminal 106. For example, the power enablement condition can occur when the terminal 106 is connected to the converter unit 102 and the power disablement time exceeds a predetermined power disablement time threshold. The power disablement time can commence when the power disablement condition is detected. For example, when the microcontroller 108 determines that the power disablement condition occurs, the power disablement time begins. The power disablement time can be reset when the power enablement condition exists and/or the converter unit 102 wakes up.

By ensuring that the power disablement time does not exceed the predetermined power disablement time threshold, the converter unit 102 can periodically monitor the charge status of the terminal 106. This prevents the terminal 106 from being fully charged, having the charging of the terminal 106 be disabled, and then having the terminal 106 be drained of its charge.

By detecting power enablement conditions, the converter unit 102 can anticipate when power consumption is necessary and/or will perform a meaningful function. This can reduce any inconvenience or impact for a user through the power consumption saving function of the battery charger 100.

As seen in FIG. 2, the converter unit 102 can also include a terminal input 121, a shell 128, and an indicator 130. The cable 104 can be connected, for example, to the terminal input 121. The terminal input 121 can be, for example, a universal serial bus (USB) input, an IEEE 1394 interface, a proprietary input specific to a terminal, or any other type of input that can be used to charge the rechargeable battery in the terminal and/or communicate with the converter unit 102. The shell 128 can be, for example, a housing which can house the components of the converter unit 102. The shell 128 can be formed from plastic, polymers, insulators, or any other type of material which can protect the components of the converter unit 102.

The indicator 130 can be an indicator regarding the battery charger 100. The indicator 130 can indicate, for example, whether the converter unit 102 is drawing power from the external power source, whether the converter unit 102 is supplying power to the terminal 106, the charge of the battery 116, or any other type of information that may be useful to a user with regards to power consumption of the battery charger 102. The indicator 130 can be, for example, a light indicator. The indicator 130 can receive power from the battery 116 and/or the external power source through the power switching unit 112, the power circuit 114, and/or the power input 118.

In one embodiment, the indicator 130 can display a first indication when the converter unit 102 is drawing power from the external power source and/or supplying the power to the terminal 106. The first indication can be, for example, a first color. The indicator 130 can display a second indication when the converter unit 102 is not drawing power from the external power source and/or not supplying power to the terminal 106. The second indication can be, for example, a second color or no indication at all. The indicator 130 can display a third indication when the converter unit 102 is not drawing power from the external power source, but is supplying power to the terminal 106. The third indication can be, for example, a third color or no indication at all.

Figure 4:
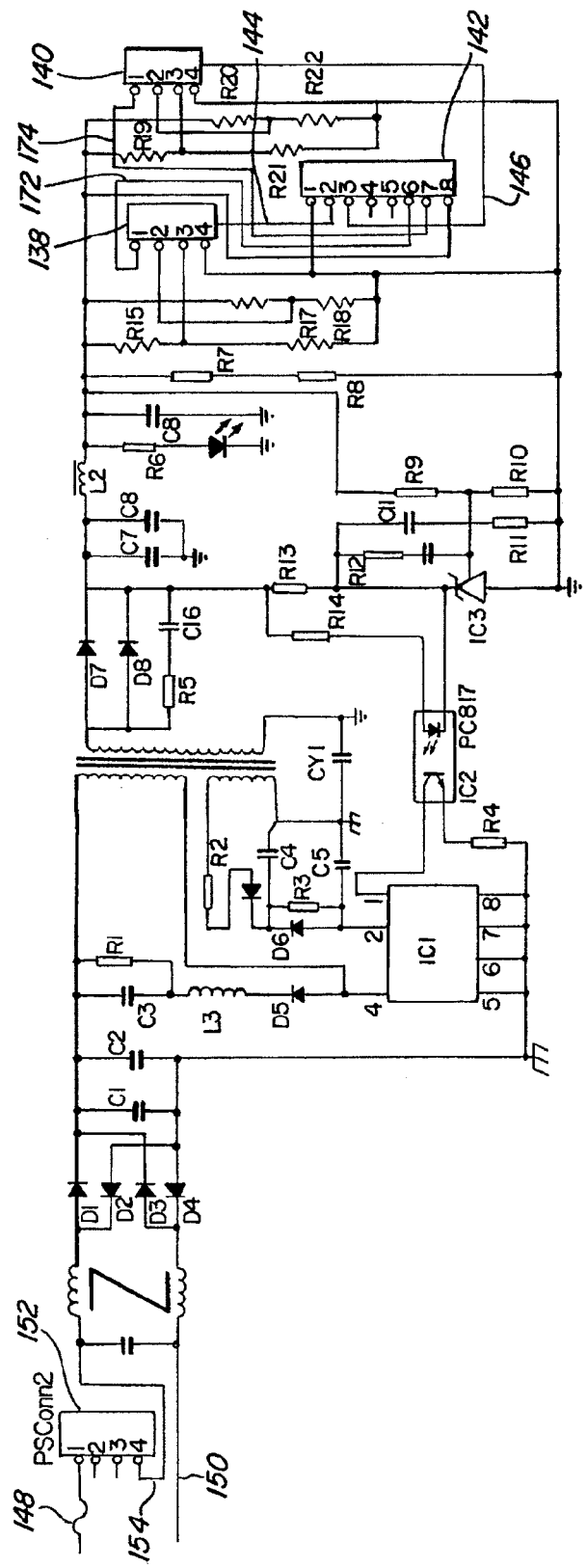
FIG. 4 is a circuit diagram of a portion of a converter unit according to an embodiment of the present disclosure.

Circuit diagrams of the converter unit 102 according to an embodiment of the present disclosure can be seen, for example, in FIGS. 4-7. As seen in FIG. 4, the terminal 106 can be connected to an input 138 or an input 140. The input 138 and the input 140 can be, for example, an input where the terminal 106 is connected to the battery charger 100 and/or the converter unit 102. For example, the cable 104 can be plugged into the input 138 and/or the input 140. The inputs 138 and 140 can be connected to pins 2 and 3 of a connection 142 through the lines 144 and 146, respectively. The inputs 138 and 140 can be connected to the pins 6 and 7 of the connection 142 through the lines 172 and 174, respectively.

Figure 5:
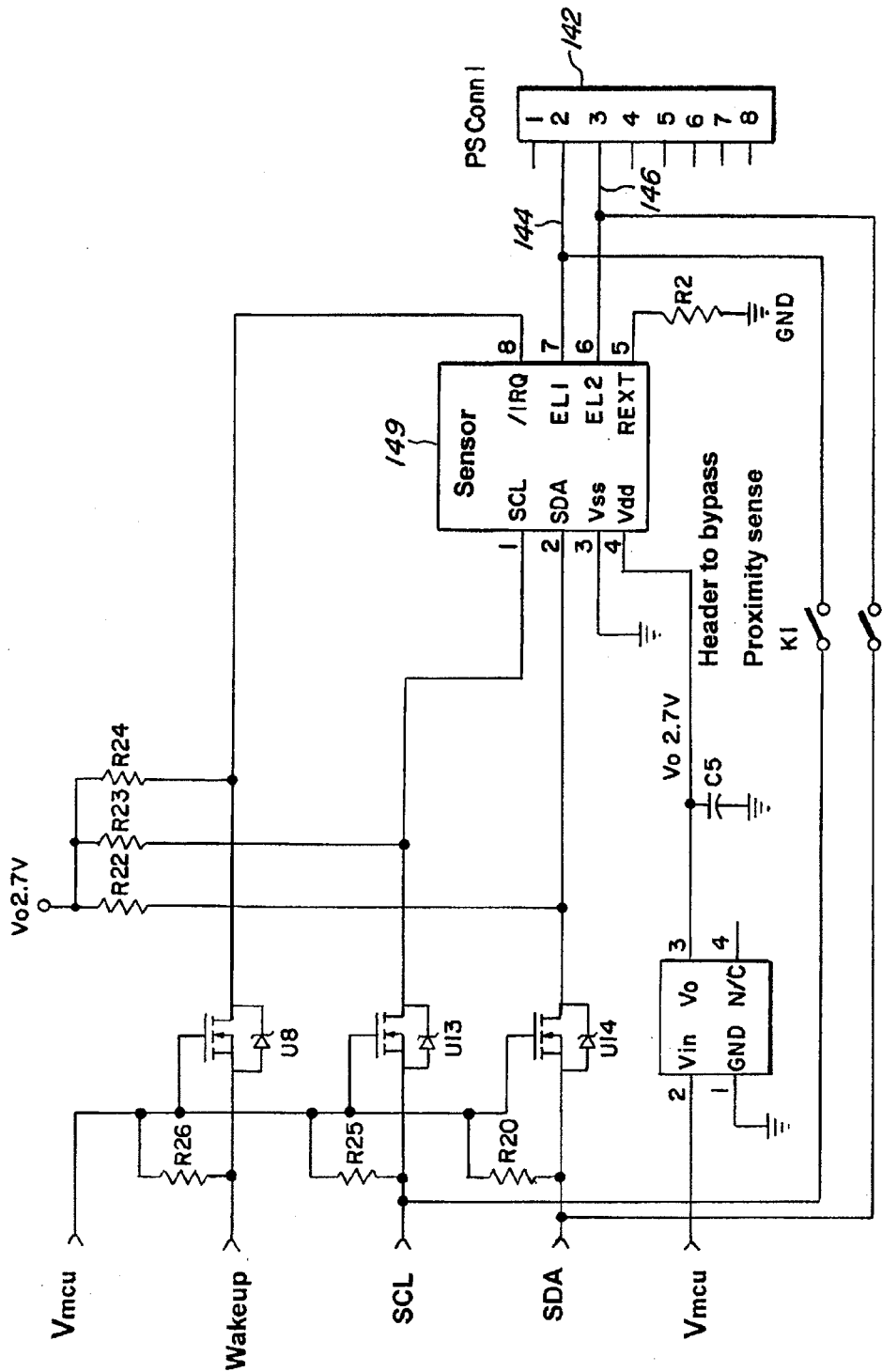
FIG. 5 is a circuit diagram of a portion of a converter unit according to an embodiment of the present disclosure.

As seen in FIG. 5, the pins 2 and 3 of the connection 142 can be used by a sensor 149 to detect whether the terminal 106 is connected to the converter unit 102 or not. The sensor 149 can detect, for example, a capacitance of the terminal 106 using the pins 2 and 3. The sensor 149 can also detect, for example, a capacitance of the cable 104 using the pins 2 and 3. The load monitor circuit 110 (FIG. 1) can include, for example, the sensor 149.

Figure 6:
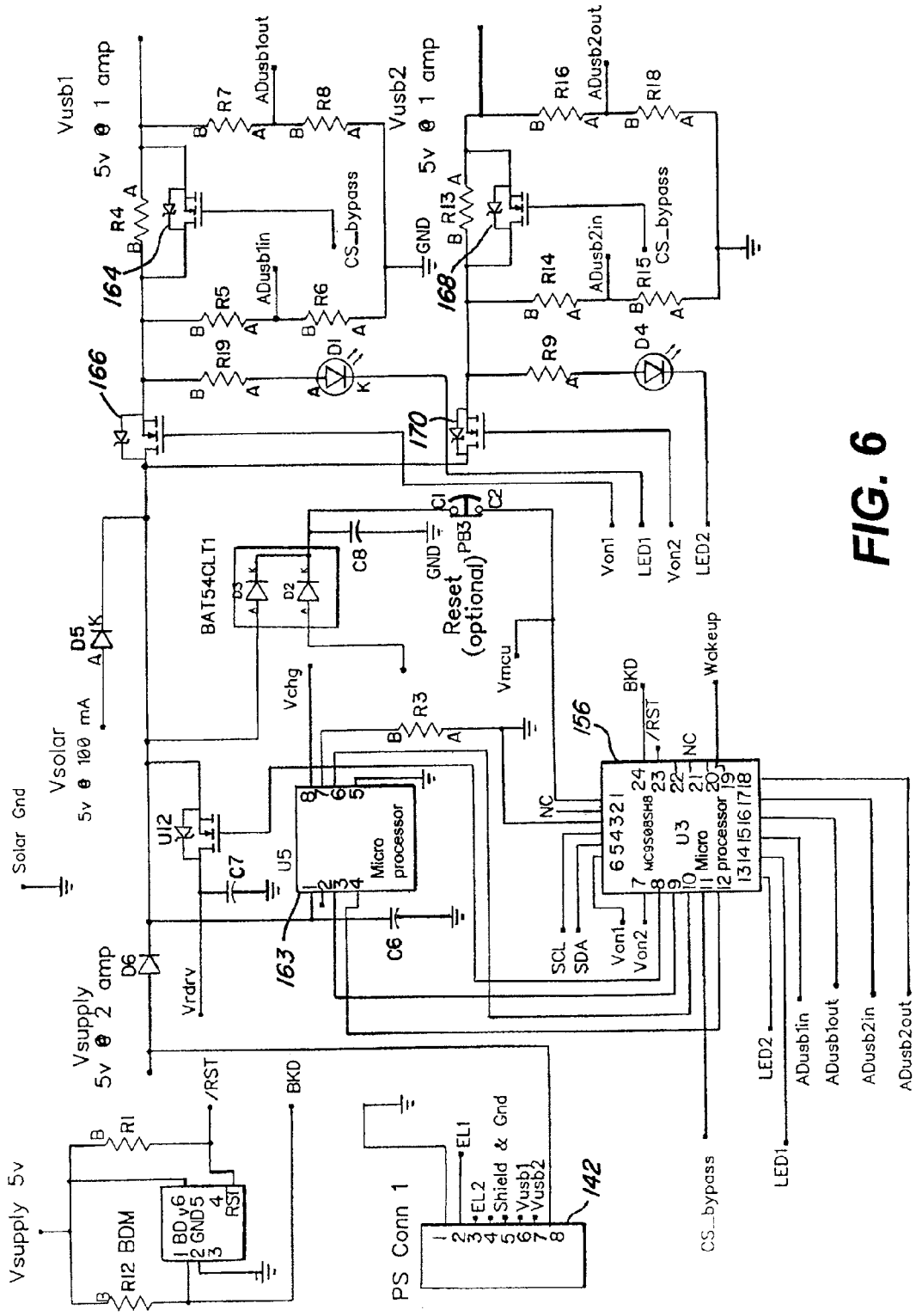
FIG. 6 is a circuit diagram of a portion of a converter unit according to an embodiment of the present disclosure.

As seen in FIGS. 5 and 6, the sensor 149 can transmit information regarding the terminal 106 to a microprocessor 156 using a voltage for microcontroller unit ("Vmcu") signal, a wakeup signal, a serial data access ("SDA") signal, and/or a serial clock line ("SCL") signal. The microcontroller 108 in FIG. 1 can include and/or correspond, for example, to the microprocessor 156. The information can include, for example, a capacitance of the terminal 106, a capacitance of the cable 104, whether the terminal 106 is connected, and/or whether the cable 104 has been touched.

As seen in FIG. 6, the microprocessor 156 receives the Vmcu signal, the wakeup signal, the SDA signal, and/or the SCL signal, and determines whether the terminal 106 is connected to the converter unit 102 and/or the battery charger 100. Referring to FIGS. 4 and 6, if the terminal 106 is connected to the converter unit 102 and/or the battery charger 100, the microprocessor 156 detects a voltage and/or current of the terminal 106 using the pins 6 and 7 of the connection 142. As previously noted, the pins 6 and 7 are connected to the inputs 138 and 140, which are connected to the terminal 106. The pins 6 and 7 can transmit the signals Vusb1 and/or Vusb2. The microprocessor 156 can also determine the charge time of the terminal 106, and whether the charge time exceeds the predetermined charge time threshold. The microprocessor 156 can then determine whether a power enablement condition or a power disablement condition has occurred.

Figure 7:
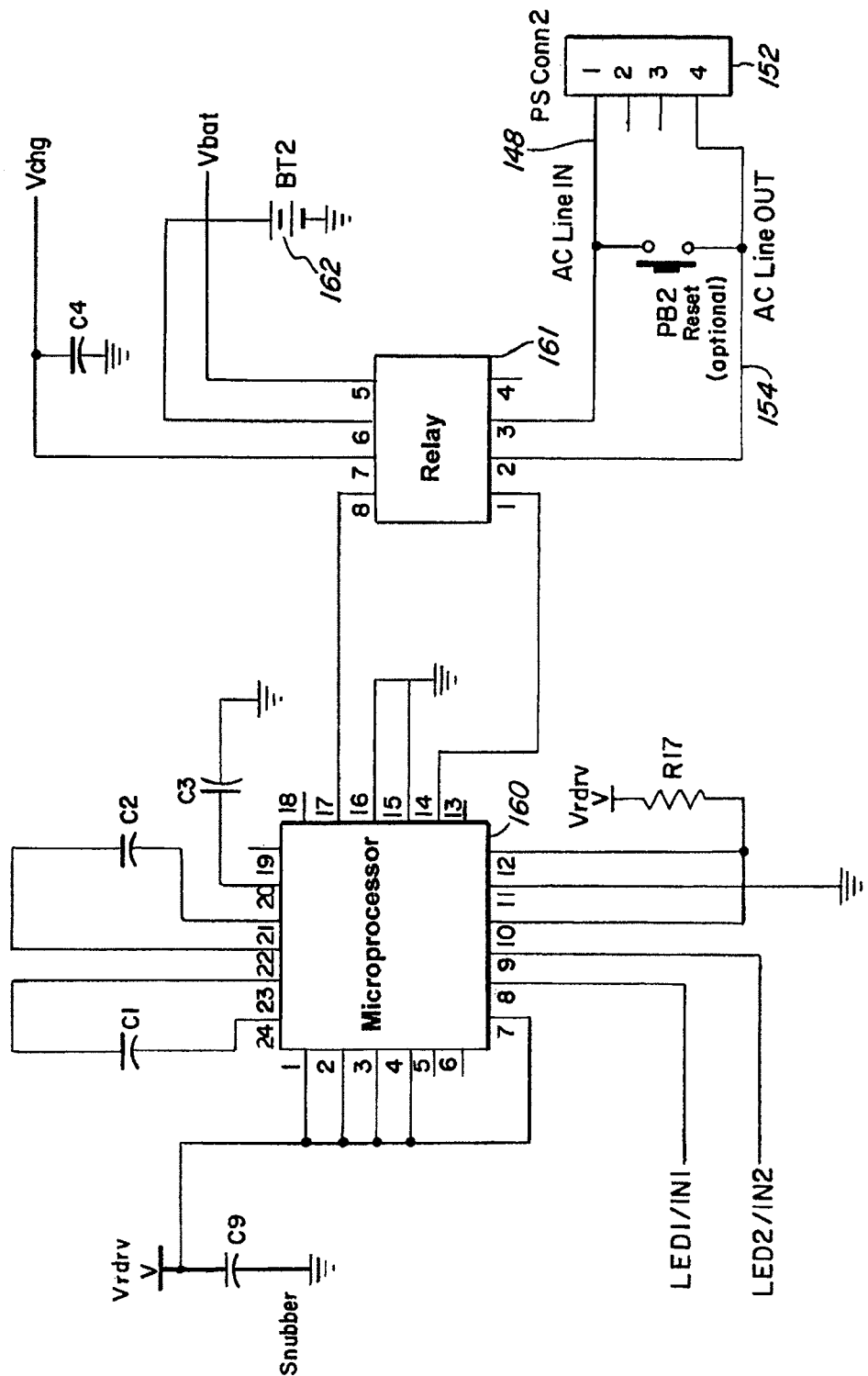
FIG. 7 is a circuit diagram of a portion of a converter unit according to an embodiment of the present disclosure.

As seen in FIGS. 6 and 7, the microprocessor 156 can send instructions, for example, to a microprocessor 160 using a LED1 signal and/or a LED2 signal based on whether the power enablement condition or the power disablement condition has occurred. Based on the instructions from the microprocessor 156, the microprocessor 160 can connect or disconnect pins in a relay 161. The latched relay 112 in FIG. 1 can include, for example, the microprocessor 160 and/or the relay 161. In one embodiment, when the pins 2 and 3 in the relay 161 are disconnected, the lines 148 and 154 do not form a complete circuit and no current flows through the lines 148 and 154. The pins 2 and 3 can be disconnected, for example, when the power disablement condition occurs. The switch 119 can correspond, for example, to the pins 2 and 3.

As seen in FIGS. 4 and 7, the lines 148 and 154 are connected to the pins 1 and 4 in the connection 152. In one embodiment, the lines 148 and a line 150 are lines which correspond to a main voltage input, such as the main voltage input 118 in FIG. 1. As previously noted, the main voltage input 118 is connected to an external power source. When the lines 148 and 154 are disconnected and no current flows through them, no current flows through the line 150 either since the line 150 requires current to flow through the lines 148 and 154 to complete a circuit. Thus, during the power disablement condition, no current flows to the converter unit 102 and the battery charger 100 does not draw power from the external power source.

During the power enablement condition, the lines 148 and 154 are connected, enabling the lines 148, 154, and 150 to complete a circuit. This allows power to flow to the converter unit 102 using the lines 148, 154, and/or the lines 150. As can be seen in FIG. 4, power flowing through the lines 148, 154, and/or the lines 150 also reaches the terminal 106 through the inputs 138, 140, and/or the connection 142. Furthermore, as seen in FIGS. 4 and 6, the current flowing to the terminal 106 through the inputs 138 and 140 are monitored by diodes 164, 166, 168, and 170 using the pins 6 and 7 and the signals Vusb1 and Vusb2 for the connection 142.

Referring back to FIG. 7, when the pins 6 and/or 7 are disconnected from the relay 161, they do not form a complete circuit for the battery 162 and no current flows to the battery 162 or the microprocessor 163. The Vchg line connected to pin 7 is connected to a microprocessor 163 as shown in FIG. 6. The microprocessor 163 can monitor an energy level of the battery 162. The battery 162 can be, for example, a rechargeable battery, a supercap, a solar cell, renewable energy devices, and/or any other type of energy storage device. In FIG. 1, the battery monitor and charging circuit 114 can include, for example, the microprocessor 163, while the battery 116 can correspond to the battery 162.

As seen in FIG. 6, the microprocessor 163 can send information regarding the battery 162 to the microprocessor 156. The microprocessor 163 can include, for example, information regarding the energy level of the battery 162. When the energy level of the battery 162 is above a predetermined energy threshold, the microprocessor 156 can instruct the microprocessor 160 to disconnect the pins 6 and 7. Thus, even when power is flowing from the external power source to the terminal 106, the battery 162 will not be charged.

However, when the energy level of the battery 162 is below a predetermined energy threshold, the microprocessor 156 can instruct the microprocessor 160 to connect the pins 6 and 7 in the relay 161 and the line Vchg and the line to the battery 162. In one embodiment, the pin 8 can also be disconnected. The microprocessor 160 can also instruct the microprocessor 160 to connect the pins 2 and 3 and the lines 148 and the lines 154 enabling the power to flow from the external power source to the converter unit 102 and the battery 162.

Figure 8:
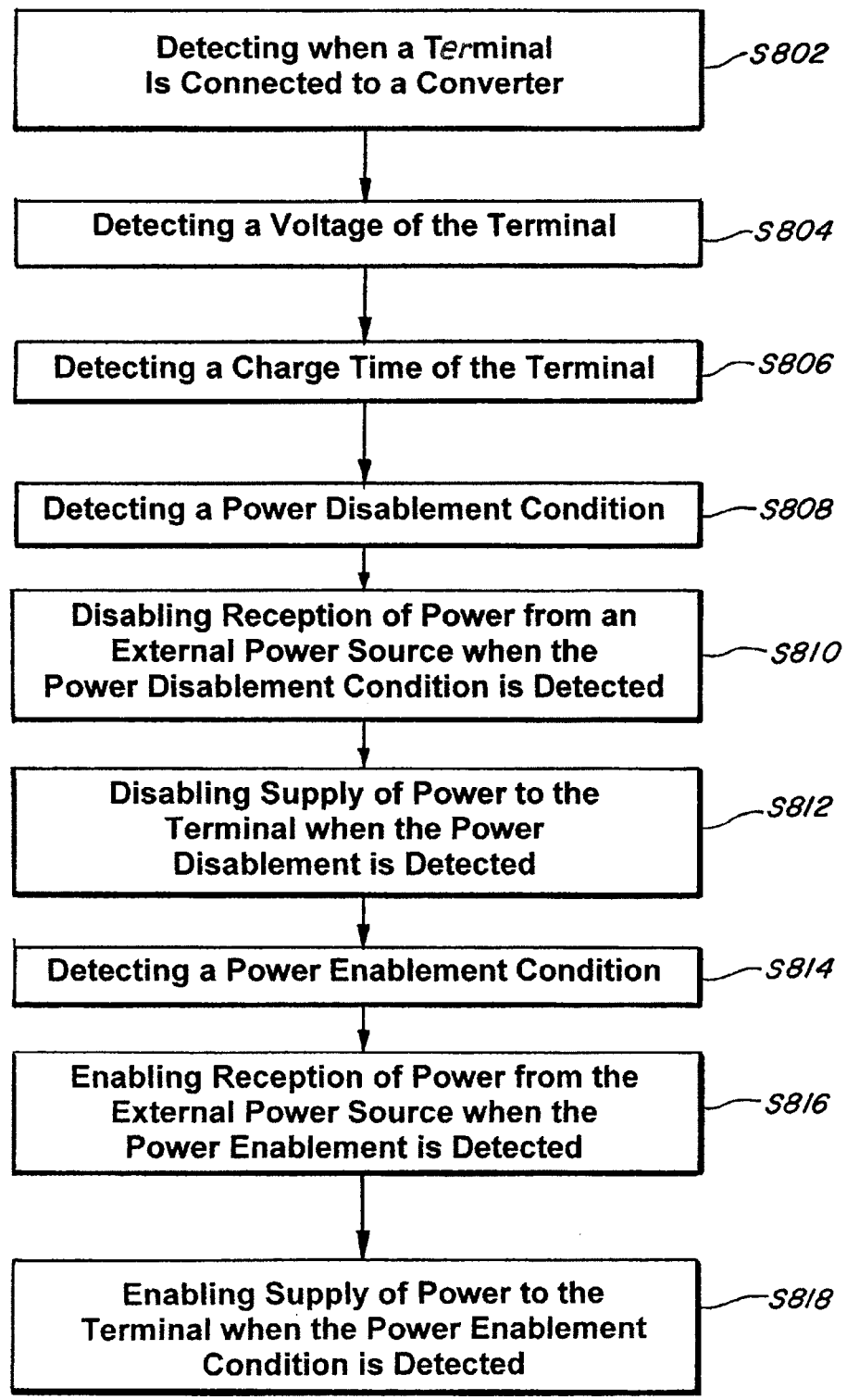
FIG. 8 is a flow chart of a process according to an embodiment of the present disclosure.

In one embodiment, the present disclosure includes a process as seen in FIG. 8. In Step S802 detection of whether a terminal 106 adaptor is electrically connected to a converter unit is performed. For example, the load monitor circuit 110 can detect whether the terminal 106 is connected to the converter unit 102. In Step S804, a voltage of the terminal 106 is detected. For example, the microcontroller 108 detects a voltage of the terminal 106. In Step S806, a charge time of the terminal 106 is detected. For example, the microcontroller 108 can detected the charge time using the load monitor circuit 110.

As seen in FIGS. 6 and 7, the converter unit 102 can also include optional reset switches. Furthermore, additional optional components are also shown in FIGS. 4-7, which can be removed or substituted for different components. Also, additional components may also be added to the converter unit 102.

In Step S808, a power disablement condition is detected. For example, the microcontroller 108 can detect and determine whether the power disablement condition has occurred or not. In Step S810, reception of power from an external power source is disabled when the power disablement condition is detected. For example, when the power disablement condition is detected, the microcontroller 108 instructs the latched relay 112 to disconnect the switch 119. In Step S812, the supply of power to the terminal 106 is disabled. For example, by disconnecting the switch 119, the converter unit 102 does not receive power and thus no power is supplied to the terminal 106.

In Step S814, a power enablement condition is detected. For example, the microcontroller 108 can detect the power enablement condition. In Step S816 when the power enablement condition is detected, reception of power from an external source is enabled. For example, when the power enablement condition is detected by the microcontroller 108, the microcontroller 108 instructs the latched relay 112 to connect the switch 119. In Step S818, when the power enablement condition is detected, supply of power to the terminal 106 is enabled. For example, when the switch 119 is connected, power flows from the external power source to the converter unit 102 and from the converter unit 102 to the terminal 106.

Figure 9:
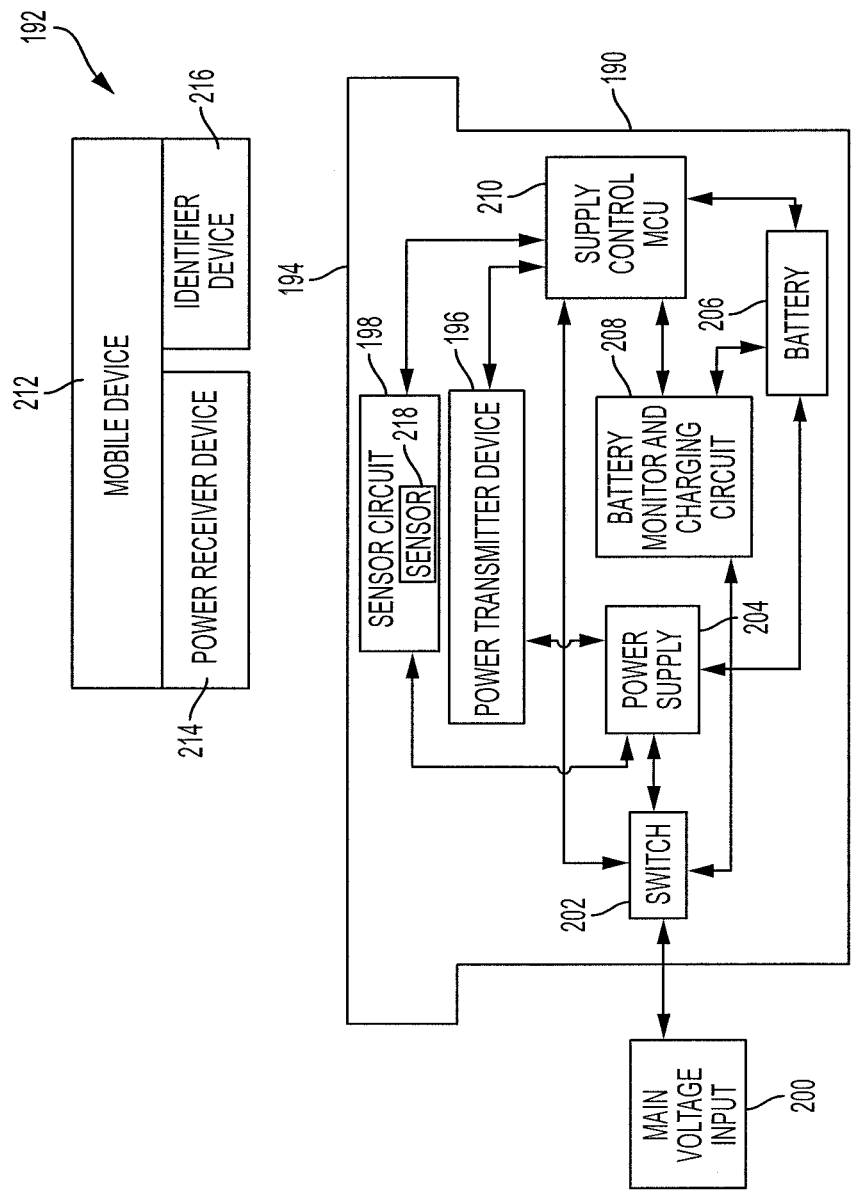
FIG. 9 is a block diagram of a system for wireless charging according to an embodiment of the present disclosure.

FIG. 9 illustrates a wireless charging unit 190 for charging a mobile device unit 192. The wireless charging unit 190 includes a power cut off feature as does the charging unit 102 shown in FIGS. 1 and 2 for example. The wireless charging unit 190 however has been constructed to address wireless charging of a mobile unit. The wireless charging unit 190 may include an interface surface 194, a power transmitter device 196, a sensor circuit 198, a main voltage input 200, a switch 202, a power supply 204, a battery 206, a battery monitor and charging circuit 208, and a microcontroller 210. The mobile device unit 192 may include a mobile device 212, a power receiver device 214, and an identifier device 216.

The mobile device 212 is an electronic device such as a music player, a cell phone or mobile phone, a mobile computer, a tablet computer, a personal digital assistant (PDA), a camera, or the like. The mobile device 212 may be a kind of device that is typically carried around by a user and draws power through its use. The mobile device 212 may include a rechargeable battery or other power source to power the mobile device 212 during use, and is charged by external power being input into the mobile device 212.

The power receiver device 214 is configured to receive power wirelessly. The power receiver device 214 may include an antenna or at least one wire configured to receive power wirelessly. In one embodiment, the antenna or the at least one wire may be configured as a coil or loop that is configured to receive power wirelessly. The antenna or at least one wire may be configured such that power is received through inductance. The antenna or at least one wire may have a current induced in it through the effect of a magnetic field applied to the antenna or at least one wire. The current may be used to deliver power to the mobile device 212. In one embodiment, the antenna or at least one wire may form a magnetic resonant coupling with a power transmitter device for the power transmitter device to deliver power to the antenna or at least one wire. In one embodiment, the antenna or the at least one wire may include multiple wires configured to receive power wirelessly, or may be replaced with another device for receiving power wirelessly.

The power receiver device 214 may include power circuitry for processing the power received wirelessly for delivery to the mobile device 212. The power circuitry may include power control, conversion, and/or filtering circuitry to prepare the power for delivery to the mobile device 212. In one embodiment, the power receiver device 214 may include a power storage device for storing the power prior to deliver to the mobile device 212.

The power receiver device 214 may be positioned external to the mobile device 212 or may be positioned internal to the mobile device 212. In an embodiment in which the power receiver device 214 is positioned external to the mobile device 212, the power receiver device 214 may be configured to include a plug or other connector that delivers power from the power receiver device 214 to the mobile device 212. The plug or other connector may couple with the power input terminal of the mobile device 212.

In one embodiment, the external power receiver device 214 may be coupled to the mobile device 212 such that the power receiver device 214 is held to the mobile device 212 and may travel with the mobile device 212. The external power receiver device 214 may be held to the mobile device 212 with an adhesive, strap, or other coupling device. In one embodiment, the external power receiver device 214 may be configured as a mobile device case for covering at least a portion of the mobile device 212. The power receiver device 214, as part of the mobile device case, may plug into the mobile device 212 when the mobile device case is positioned on the mobile device 212.

In an embodiment in which the power receiver device 214 is positioned internal to the mobile device 212, the power receiver device 214 may include a plug or other connector internal to the mobile device 212 that connects to a power input of the device 212. In one embodiment, the internal power receiver device 214 may be provided as a device separate from the mobile device 212 that is configured to be installed into the mobile device 212. In one embodiment, the internal power receiver device 214 may be manufactured with the mobile device 212 and be integrated with the mobile device 212 at the time of manufacture.

The identifier device 216 is configured to provide an identifier for the mobile device 212 that may be detected by a sensor. The identifier device 216 may include an antenna or other device configured to transmit an identifying signal. In one embodiment, the identifier device 216 may be a radio frequency identification (RFID) tag that may be either passive, active, or battery-assisted passive. The RFID tag may include an integrated circuit for storing identifying information, and an antenna for transmitting the identifying information. Similar to the power receiver device 214, the identifier device 216 may be positioned external or internal to the mobile device 212. In one embodiment, the identifier device 216 may be included in a mobile device case, similar to the power receiver device 214.

The power receiver device 214 and/or the identifier device 216 may be provided separately from the mobile device 212 and may be configured to couple to the mobile device 212. For example, the power receiver device 214 and/or the identifier device 216 may be provided in combination with the wireless charging unit 190 and may be configured to operate with a variety of different kinds of mobile devices 212. The power receiver device 214 and/or the identifier device 216 may also be formed integral with the mobile device 212 and be for use only with that kind of mobile device 212.

The combination of the mobile device 212, the power receiver device 214, and/or the identifier device 216 forms the mobile device unit 192, which is the portable combination of these devices.

The interface surface 194 forms a portion of the wireless charging unit 190 for the mobile device unit 192 to be positioned upon. The interface surface 194 may form part of a housing that contains other components of the wireless charging unit 190, or may form part of a housing of the wireless charging unit 190 that does not contain other components. In one embodiment, the interface surface 194 may form a top of the wireless charging unit 190. The interface surface 194 may have a flattened shape or in one embodiment may have a curved shape. In one embodiment, the interface surface 194 may be shaped to match the shape of the mobile device 212.

The power transmitter device 196 is configured to transmit power wirelessly. The power transmitter device 196 may include an antenna or at least one wire configured to transmit power wirelessly. In one embodiment, the antenna or the at least one wire may be configured as a coil or loop that is configured to transmit power wirelessly. The antenna or at least one wire may be configured such that power is transmitted through inductance. The antenna or at least one wire may be configured to produce a magnetic field that is capable of inducing a current induced in a nearby antenna or at least one wire. In one embodiment, the antenna or at least one wire may be configured to form a magnetic resonant coupling with the power receiver device 214 to deliver power to the power receiver device 214 for use to charge the mobile device 212. The antenna or at least one wire of the power transmitter device 196 may form a magnetic resonant coupling with the antenna or at least one wire of the power receiver device 214. In one embodiment, the antenna or the at least one wire of the power transmitter device 196 may include multiple wires configured to transmit power wirelessly, or may be replaced with another device for transmitting power wirelessly.

The power transmitter device 196 may include power control circuitry that is configured to vary the amount of power that is transmitted from the power transmitter device 196.

The power transmitter device 196 is configured to deliver power wirelessly to the mobile device unit 192 when the mobile device unit 192 is positioned on the interface surface 194. The power transmitter device 196 may be configured to align with the power receiver device 214 such that power may be more efficiently transmitted wirelessly to the power receiver device 214. If the power transmitter device 196 includes a coil or plurality of coils, then the coil or coils of the power transmitter device 196 may need to align with a coil or plurality of coils of the power receiver device 214. To allow the power transmitter device 196 to align with the power receiver device 214, a marking may be placed on the interface surface 194 indicating the appropriate location to place the mobile device unit 192. In one embodiment, a structure may be formed on the interface surface 194 for aligning the mobile device unit 192 in the appropriate location.

In one embodiment, the power transmitter device 196 may include a plurality of devices for transmitting power such as antennas positioned at various locations along the interface surface 194. The plurality of devices may provide a wider area for the mobile device unit 192 to be positioned to wirelessly receive power from the power transmitter device 196. In one embodiment, the power transmitter device 196 may be configured to physically move its position according to the position that the mobile device unit 192 and the power receiver device 214 have on the interface surface 194. In this embodiment, the power transmitter device 196 may move to position itself beneath the power receiver device 214.

The power transmitter device 196 may be positioned beneath the interface surface 194, and an antenna, or at least one wire, or other device for transmitting power wirelessly may be positioned close to and beneath the interface surface 194. The antenna, or at least one wire, or other device for transmitting power wirelessly may be positioned close to the interface surface 194 to allow the transmitter device to more efficiently deliver power to the power receiver device 214 positioned above the interface surface 194.

The sensor circuit 198 is configured to detect the presence of the mobile device unit 192. The sensor circuit 198 may be configured to detect when the mobile device unit 192 is within a certain distance or proximity of the interface surface 194. In one embodiment, the distance from the interface surface 194 may be small, such that the sensor circuit 198 may be able to detect whether the mobile device unit 192 is touching the interface surface 194 or not. In one embodiment, the distance from the interface surface 194 may be set such that the sensor circuit 198 may detect whether the mobile device unit 192 is one millimeter from the interface surface 194, one centimeter from the interface surface 194, or ranges in between one millimeter and one centimeter, or a distance greater than one centimeter.

In one embodiment, the sensor circuit 198 may be configured to detect the distance of the mobile device unit 192 from the interface surface 194 by detecting a variation in the inductance of the power transmitter device 196. The power transmitter device 196 may produce a magnetic field used to deliver power to the power receiver device 214. The presence of the mobile device unit 192 may disrupt the magnetic field and cause a variance in the inductance of the power transmitter device 196. The sensor circuit 198 may be configured to detect this variance, and determine a distance the mobile device unit 192 is from the interface surface 194 based on this variance.

In one embodiment, the sensor circuit may include a sensor 218 configured to sense the distance of the mobile device unit 192 from the interface surface 194. In one embodiment, the sensor 218 may be an inductive sensor that operates similarly to a configuration in which the sensor circuitry detects a variance in the inductance in the power transmitter device 196. Namely, the sensor 218 may produce a magnetic field that is disrupted by the presence of the mobile device unit 192. The inductance of the sensor 218 may vary, and the sensor circuit 198 may accordingly detect the distance of the mobile device unit 192 from the interface surface 194 based on this variance.

In one embodiment, the sensor 218 may be a capacitive sensor that detects the distance of the mobile device unit 192 from the interface surface 194 based on a variation in a capacitance of the sensor 218. The capacitive sensor may be configured such that the presence of the mobile device unit 192 causes a variation in an electric field produced by the sensor 218, which accordingly varies the capacitance of the sensor 218. The sensor circuit 198 may accordingly detect the distance of the mobile device unit 192 from the interface surface 194 based on the variance of the capacitance.

In one embodiment, the sensor 218 may be an optical sensor that detects the distance of the mobile device unit 192 from the interface surface 194 based on an optical signal detected by the optical sensor. The optical sensor may be configured to emit light, which may be in the infrared range for example, or any other range as desired. The mobile device unit 192 may reflect the emitted light back to the optical sensor, allowing a distance of the mobile device unit 192 from the interface surface 194 to be determined. The sensor circuit 198 may accordingly detect the distance of the mobile device unit 192 from the interface surface 194 based on the reflected light produced by the mobile device unit 192.

In one embodiment, the sensor 218 may be a touch pad that detects direct physical contact between the mobile device unit 192 and the interface surface 194. The touch pad may be capacitive or resistive or operate using a piezoelectric device. With a capacitive touch pad, the sensor circuit 198 may detect the position of the mobile device unit 192 and move the power transmitter device 196 to the location of the mobile device unit 192 to transmit power to the mobile device unit 192. In a touch pad embodiment, the sensor circuit 198 may detect the distance of the mobile device unit 192 from the interface surface 194 (e.g., whether the mobile device unit 192 is immediately upon the surface 194) based on the physical contact detected by the sensor 218.

In one embodiment, the sensor 218 may be a mechanical trigger such as a scale or other trip switch. The sensor 218 in this embodiment may be activated by the mobile device unit 192 physically contacting and applying a force to the sensor 218. The sensor circuit 198 may accordingly detect the distance of the mobile device unit 192 from the interface surface 194 (e.g., whether the mobile device unit 192 is immediately upon the surface 194) based on the physical contact detected by the sensor 218.

In one embodiment, the sensor 218 may be an RFID reader configured to detect a signal produced by the identifier device 216 in the form of an RFID tag. The sensor 218 may be configured to transmit a signal to the RFID tag, and detect the distance of the mobile device unit 192 from the interface surface 194 based on the strength of the return signal received from the RFID tag. The sensor circuit 198 may accordingly detect the distance of the mobile device unit 192 from the interface surface 194 based on the signal detected by the sensor 218. In this embodiment, the sensor 218 may additionally receive the identifying information from the RFID tag, and the sensor circuit 198 may be configured to process this information to determine if a particular mobile device unit 192 is positioned above the interface surface 194.

In other embodiments, the sensor circuit 198 may be configured to include other forms of proximity sensors or other devices for detecting the distance of the mobile device unit 192 from the interface surface 194.

The main voltage input 200 is configured to draw power from a power source external to the wireless charging unit 190. The main voltage input 200 may be configured to receive power that is from a power outlet external to the wireless charging unit 190. The power outlet may be a wall outlet, a power strip outlet, or other form of power outlet for delivering power. The main voltage input 200 may be configured as a power connector plug or other form of power connector for connecting to the external power source. The main voltage input 200 may be a DC plug or AC plug as desired. A DC plug may be configured to connect to a DC outlet, such as a 12 V DC outlet, in an automobile. An AC plug may be configured to connect to an electrical socket, such as a 110 V or 120 V socket, in a conventional house. The main voltage input 200 may be a male or female power connector plug positioned at the end of a cord or cable, or may be positioned directly upon a housing of the wireless charging unit 190.

The switch 202 is configured to disable reception of power by the main voltage input 200. The switch 202 may be electrically coupled to the main voltage input 200 such that when the switch 202 is open the main voltage input 200 draws no power from the external power source and when the switch 202 is closed the main voltage input 200 draws power from the external power source. The switch 202 may be a mechanical switch or solid state switch. The switch 202 in the form of a mechanical switch may be a latching relay or other form of relay. The switch 202 in the form of a solid state switch may be a transistor, an opto-isolator, a solid-state relay, or the like.

The switch 202 may be electrically coupled to the components of the wireless charging unit 190 such that the switch 202 may cut off all external power input into the wireless charging unit 190. In one embodiment, the switch 202 may be electrically coupled to the components of the wireless charging unit 190 such that select components remain powered through the external power source yet certain components remain unpowered. For example, components that draw larger amounts of power such as the power transmitter device 196 may remain unpowered, yet components that draw smaller amounts of power such as the microcontroller 210 may remain powered. In one embodiment, all components aside from power filtering components electrically coupled between the switch 202 and the main voltage input 200 may remain unpowered.

The power supply 204 is configured to process the power supplied from the main voltage input 200 and distribute the power to components of the wireless charging unit 190. The power supply 204 may include components for converting, filtering, or stepping the power provided from the main voltage input 200. The power supply 204 may include a transformer for stepping voltage or current, or circuitry for converting AC input power to DC output power. The power supply 204 may additionally include components for supplying AC power to the power transmitter device 196 for transmission to the power receiver device 214. The switch 202 is electrically coupled between the power supply 204 and the main voltage input 200 to prevent power draw by components of the power supply 204. For example, a transformer of the power supply 204 may not draw power from the main voltage input 200 when the switch 202 is open.

The battery 206 is configured to deliver power to components of the wireless charging unit 190 when the switch 202 is open and external power is not being drawn from the main voltage input 200. The battery 206 may be electrically coupled to any component of the wireless charging unit 190 to deliver power thereto, including the sensor circuit 198 and/or the power transmitter device 196. The battery 206 may be a rechargeable battery. In one embodiment, the battery 206 may be substituted with another form of power source, including a solar cell, a capacitor, a super capacitor, or the like.

The battery monitor 208 is configured to supply power to the battery 206 from the power supply 204. In one embodiment, the battery monitor 208 may be configured to detect a power level of the battery 206. The battery monitor 208 may be configured to direct power from the power supply 204 to the battery 206 when the detected power of the battery 206 is low or less than full. In one embodiment, the battery monitor 208 may be configured to detect the power level of the battery 206 when the switch 202 is open and no external power is drawn by the wireless charging unit 190. The battery monitor 208 may produce a signal to close the switch 202 such that external power may be drawn to charge the battery 206. Upon the battery monitor 208 detecting that the battery 206 is full or at a desired power level, the battery monitor 208 may then produce a signal to open the switch 202 such that no further external power is drawn by the wireless charging unit 190.

The microcontroller 210 is configured to process signals from the sensor circuit 198, the power transmitter device 196, and/or the battery monitor 208. The microcontroller 210 may be configured to produce a signal for the switch 202 to open or close based on the signals produced by the sensor circuit 198, the power transmitter device 196, and/or the battery monitor 208.

In operation, the mobile device unit 192 is carried around by a user and utilized until the user desires to charge a battery or other energy source of the mobile device unit 192.

The power receiver device 214 and/or the identifier device 216 may be coupled to and carried around with the mobile device 212. The mobile device unit 192 is drawn closer to the interface surface 194 and may be placed on the interface surface 194 for wireless charging of the mobile device unit 192 to commence. When the mobile device unit 192 is positioned on or near the interface surface, the power transmitter device 196 wirelessly transmits power to the power receiver device 214. The wireless power transmission may occur through any method discussed earlier in this application, for example, inductive power transmission may be used to deliver power from the power transmitter device to the power receiver device 214. The power receiver device 214 may deliver the received power to the mobile device 212.

After the mobile device 212 has been charged to the desired amount, the mobile device unit 192 is removed from the interface surface 194. The sensor circuit 198 may be configured to detect when the mobile device unit 192 has been removed from the interface surface 194 to a certain distance through any method discussed earlier in this application. The distance detected by the sensor circuit 198 may be whether the mobile device unit 192 has been immediately removed from the interface surface 194, or have been removed from the interface surface 194 to a greater distance.

The switch 202 automatically opens in response to the sensor circuit 198 detecting that the mobile device unit 192 has been removed from the interface surface 194 to a distance. The sensor circuit 198 may transmit a signal directly to the switch 202 to instruct the switch 202 to open, or the sensor circuit 198 may transmit a signal to the microcontroller 210, which then causes the microcontroller to produce a signal that opens the switch 202. The open switch 202 may prevent the main voltage input 200 from drawing power from an external power source. The open switch 202 may cut off external power draw for components of the wireless charging unit 190, including the power transmitter device 196, the sensor circuit 198, the power supply 204, the battery 206, the battery monitor 208, and/or the microcontroller 210.

The power cut off by the switch 202 may beneficially reduce external power draw by the wireless charging unit 190. Components such as the power supply 204 and/or the power transmitter device 196 may draw large amounts of power that are beneficially reduced when the mobile device unit 192 is removed from the interface surface 194 because it no longer needs charging. In one embodiment, components such as the power supply 204 and/or the power transmitter device 196 may remain off when the switch 202 is open.

The sensor circuit 198 may be used to detect when the mobile device unit 192 is again brought within a distance of the interface surface 194 to cause the switch 202 to close and external power to be drawn by the wireless charging unit 190. In an embodiment in which the sensor circuit 198 is a mechanical trigger, the sensor circuit 198 may not need to be powered by the battery 206 when the switch 202 is open. The mechanical trigger may serve to mechanically detect the presence of the mobile device unit 192 and may close a circuit to that causes the switch 202 to close when the mobile device unit 192 is present. In one embodiment, the mechanical trigger may mechanically link with the switch 202 to open or close the switch 202 without the use of the battery 206. In an embodiment in which the sensor circuit 198 is electrically powered to open or close the switch 202, the battery 206 may supply power to the sensor circuit 198 when the switch 202 is open.

The sensor circuit 198 may be used to detect when the mobile device unit 192 is again brought within a distance of the interface surface 194 through any method discussed earlier in this application. In an embodiment in which the sensor circuit 198 detects a variance in the inductance of the power transmitter device 196, the battery 206 may supply a low amount of power to the power transmitter device 196 sufficient to detect the presence of the mobile device unit 192 through inductance, even though the switch 202 remains open. In an embodiment in which the sensor circuit 198 detects the presence of the mobile device unit 192 through an RFID tag, then the battery 206 may provide sufficient power to the sensor 218 to detect the presence of the RFID tag.

The sensor circuit 198 may transmit a signal directly to the switch 202 to instruct the switch 202 to close, or the sensor circuit 198 may transmit a signal to the microcontroller 210, which then causes the microcontroller to produce a signal that closes the switch 202. The closed switch 202 may allow the main voltage input 200 to draw power from an external power source. The closed switch 202 may allow external power draw for components of the wireless charging unit 190, including the power transmitter device 196, the sensor circuit 198, the power supply 204, the battery 206, the battery monitor 208, and/or the microcontroller 210.

The wireless charging unit 190 may beneficially allow for external power draw at a time when the mobile device unit 192 is in a desired range for charging, and prevent external power draw when the mobile device unit 192 is not in a desired range for charging.

In one embodiment, an external override switch may be used to either open or close the switch 202 at a time as desired.

In an embodiment in which an RFID detector is used as the sensor 218, the switch 202 may be configured to open or close when a specific mobile device unit 192 is in position for charging. For example, the identifier device 216 in the form of an RFID tag may be set to identify a particular user's mobile device 212. Upon the particular user placing their mobile device 212 on the interface surface 194, the switch will close to allow for charging of the mobile device 212. This feature may prevent unwanted users from wirelessly charging their phones using the wireless charging unit 190.

Figure 10:
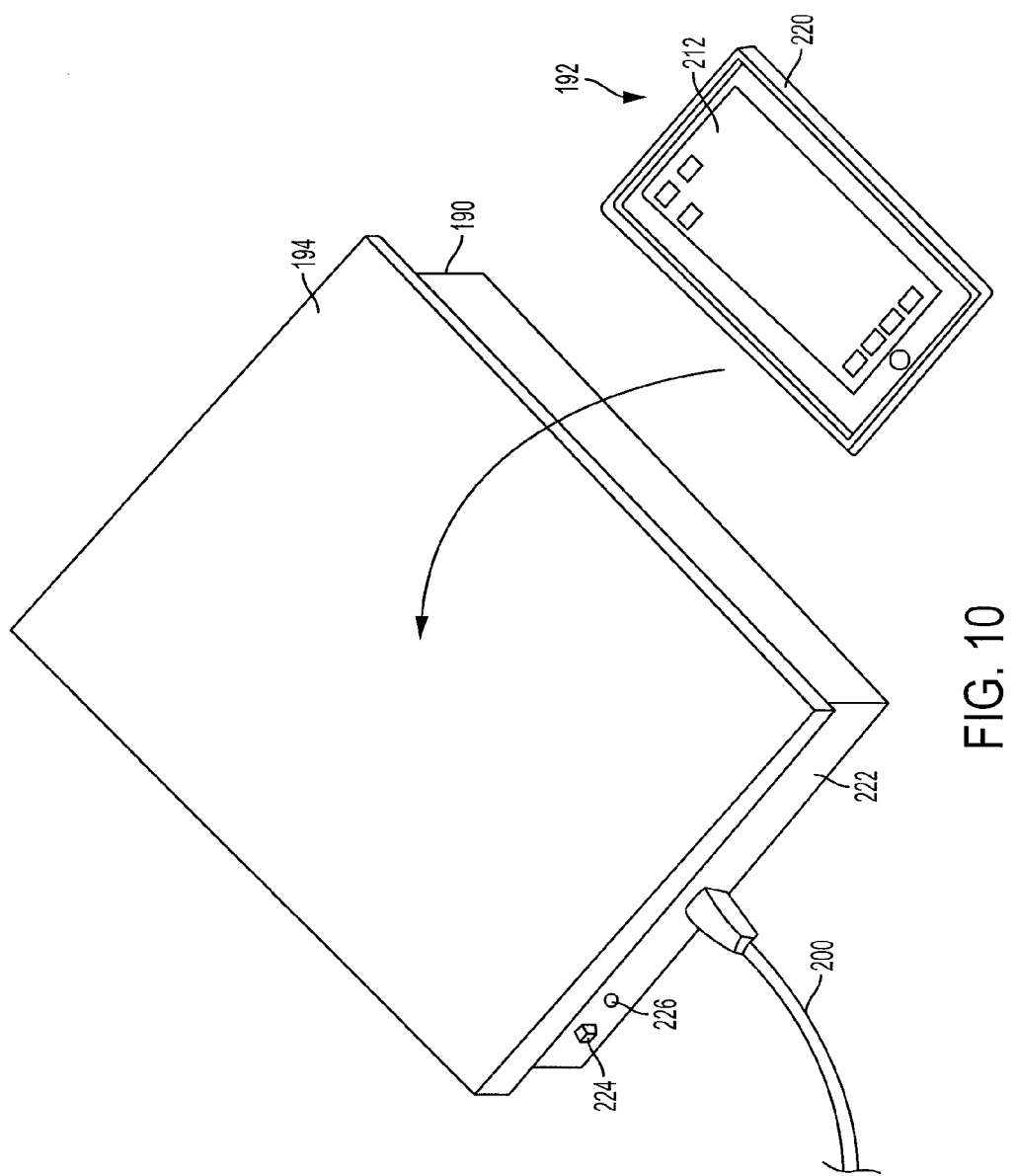
FIG. 10 is a perspective view of a system for wireless charging according to an embodiment of the present disclosure.

FIG. 10 illustrates a perspective view of a mobile device unit 192 and a wireless charging unit 190 according to an embodiment of the disclosure. The mobile device unit 192 includes a mobile device 212 covered with a mobile device case 220. The mobile device case 220 covers and protects surfaces of the mobile device 212. The mobile device case 220 in this embodiment includes the power receiver device 214 within the case 220, such that the power receiver device 214 may be removed from the mobile device 212 when the case 220 is removed from the mobile device. The power receiver device 214 in this embodiment is configured to plug into a power input of the mobile device 212 to charge a battery of the mobile device 212. The identifier device 216 may additionally be positioned within the case 220.

The wireless charging unit 190 is shown to include a housing 222 that contains the components of the wireless charging unit 190. The interface surface 194 forms a top surface of the housing 222 for receiving the mobile device unit 192. In this embodiment an override switch 224 is positioned on the housing 222 for overriding the operation of the switch 202. An indicator light 226 is positioned on the housing 222 for displaying an on or an off condition of the wireless charging unit 190.

In the embodiment shown in FIG. 10, the wireless charging unit 190 is portable, such that it may be easily transported and positioned on a table top or the like if desired.

Figure 11:
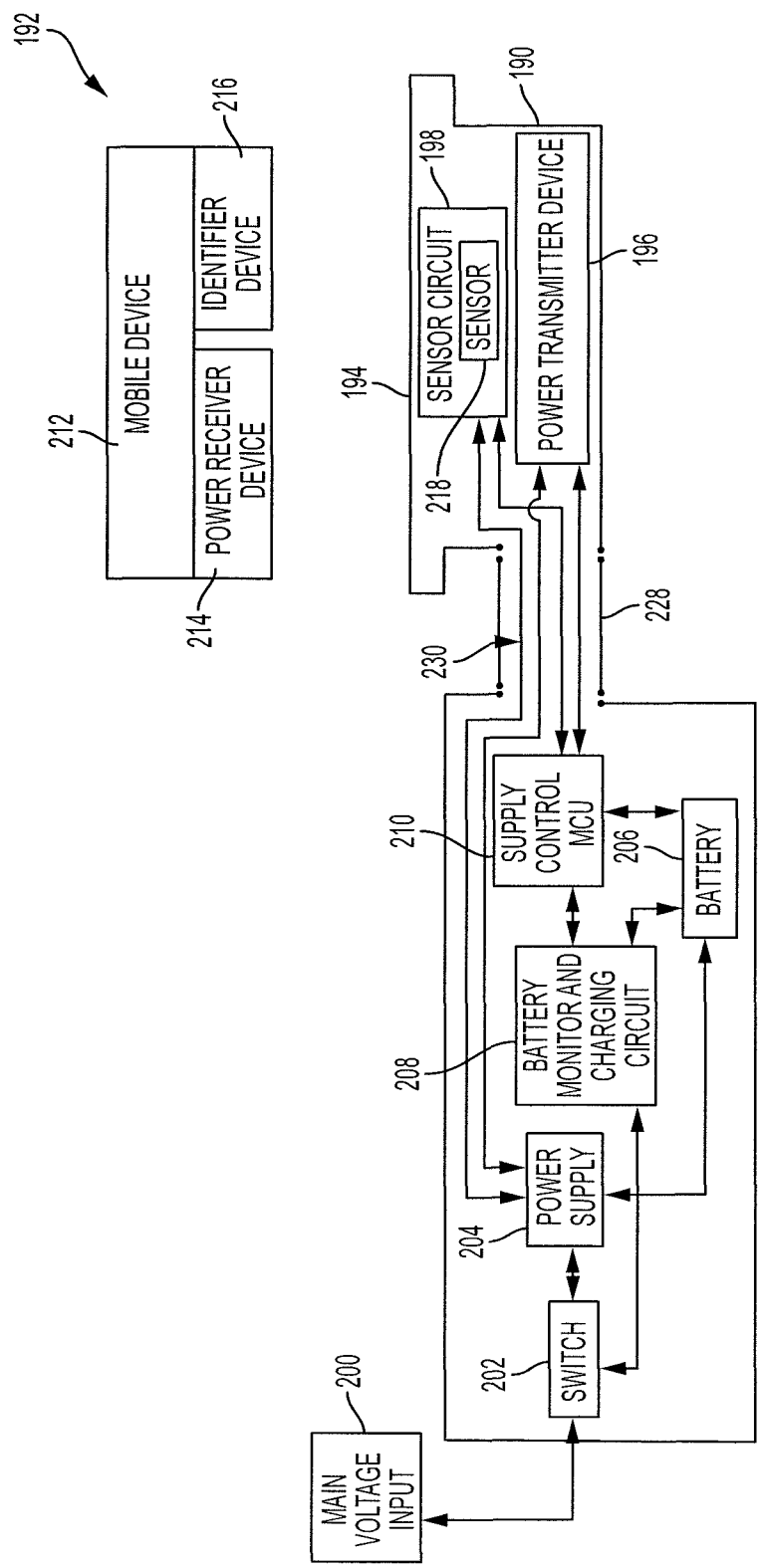
FIG. 11 is a block diagram of a system for wireless charging according to an embodiment of the present disclosure.

FIG. 11 illustrates an embodiment of the wireless charging unit 190 in which the interface surface 194 and power transmitter device 196 are positioned within the housing of the wireless charging unit 190 separate from other components of the unit 190. The portion of the housing including the interface surface 194 may connect to the portion of the housing containing the other components of the unit 190 through a connector 228 such as a cable or the like. The connector 228 may be configured to be removably or non-removably coupled between the housing portions. In an embodiment in which the connector 228 is removably coupled, the interface surface 194 may be separated from the remaining components. Electrical conduits 230 may pass through the connector 228 that link the components in the portions of the housing.

FIG. 12 illustrates a perspective view of a mobile device unit 192 and a wireless charging unit 190 according to the embodiment described in regard to FIG. 11. The interface surface 194 and power transmitter device 196 are positioned within the housing of the wireless charging unit 190 separate from other components of the unit 190. A connector 228 in the form of a cable links the housing portions. The connector 228 may be removably or non-removably coupled between the housing portions.

In one embodiment, the portion of the housing that does not include the interface surface may be configured similarly as the converter unit discussed in regard to FIGS. 1 and 2. The converter unit 102 may receive a signal from the portion of the housing including the interface surface 194 indicating whether or not the mobile device unit 192 is within a distance of the interface surface 194. This signal may operate similarly as the signals indicating a power enablement condition or power disablement condition as discussed in regard to the converter unit 102. The converter unit 102 may cut off power from an external power source or perform any other operation discussed in regard to a power enablement or power disablement condition. The signal may be received from the sensor circuit 198. In one embodiment, the connector 228 may operate similarly as cable 104, and transmit the signal. The connector 228 or cable 104 may removably or non-removably connect with the portion of the housing including the interface surface 194. The transmitted signal may be a signal indicating the capacitance of cable 104, in the manner discussed in regard to converter unit 102. Any portion of cable 104 including portions 132 or 134, or any portion of connector 228 including electrical conduits 230 or an outer shell and/or grounding shell or sleeve of connector 228 may transmit the signal. In such an embodiment, the converter unit 102 may be used to directly couple to mobile devices for wired charging, and may also be used to couple to a housing that includes an interface surface 194 for wireless charging.

In one embodiment, the power transmitter device 196 may be configured to provide a wired connection to a mobile device or mobile device unit. The wired connection may be via one or more contact terminals on the interface surface 194. The mobile device or mobile device unit may be positioned on the interface surface 194 and contact one or more of the contact terminals for charging. The sensor circuit 198 may be configured to detect the presence of the mobile device or mobile device unit in any manner as discussed in this application and may cause a cut off of power from an external power source. In one embodiment, the sensor circuit 198 may be configured to detect a voltage level change or current draw of the mobile device or mobile device unit to determine whether to cut off power draw in a similar manner as the load monitor circuit 110. An embodiment of the charging unit in which the power transmitter device 196 is configured to perform wired charging may be configured in the manner discussed in regard to the embodiments of FIGS. 9-12. An embodiment of the charging unit in which the power transmitter device 196 is configured to perform wired charging may include use of the charging unit of FIGS. 1-2 in the manner discussed in regard to FIGS. 11-12.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. Furthermore the method and/or algorithm need not be performed in the exact order described, but instead may be varied. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wireless charging unit for a mobile device unit comprising:
   an interface surface for the mobile device unit to be positioned upon;
   a power transmitter device configured to transmit power wirelessly to the mobile device unit when the mobile device unit is positioned upon the interface surface to charge the mobile device unit;

a power connector plug configured to receive external power from an external power outlet for powering the power transmitter device;
a sensor circuit configured to:
  detect when the mobile device unit has been positioned within a distance away from the interface surface, and
  detect when the mobile device unit has been removed from the interface surface beyond the distance away from the interface surface;
a switch electrically coupled to the power connector plug and configured to:
  enable reception of the external power by the power connector plug from the external power outlet in response to the sensor circuit detecting that the mobile device unit has been positioned within the distance of the interface surface, and
  disable reception of the external power by the power connector plug from the external power outlet in response to the sensor circuit detecting that the mobile device unit has been removed from the interface surface beyond the distance; and
a battery configured to power the sensor circuit when the switch has disabled the reception of the external power by the power connector plug from the external power outlet.

2. The unit of claim 1, wherein the wireless charging unit includes a housing that the power transmitter device, the sensor circuit, and the switch are positioned within, with the power outlet being positioned external to the housing.

3. The unit of claim 2, wherein the interface surface is an upper surface of the housing.

4. The unit of claim 2, wherein the switch is configured such that the disabling of the reception of power by the power connector plug from the power outlet by the switch disables any power exterior to the housing from being drawn by the wireless charging unit.

5. The unit of claim 1, wherein the power transmitter device is configured to transmit power wirelessly to the mobile device unit inductively.

6. The unit of claim 5, wherein the power transmitter device is configured to transmit power wirelessly to the mobile device unit through a magnetic resonant coupling with a power receiver device of the mobile device unit.

7. The unit of claim 1, wherein the switch is a latching relay.

8. The unit of claim 1, wherein the sensor circuit is configured to detect that the mobile device unit has been removed from the interface surface to a distance away from the interface surface by detecting a variation in inductance of the power transmitter device.

9. The unit of claim 1, wherein the sensor circuit includes a capacitive sensor, and the sensor circuit is configured to detect that the mobile device unit has been removed from the interface surface based on a signal produced by the capacitive sensor.

10. The unit of claim 1, wherein the wireless charging unit includes a mechanical trigger, and the sensor circuit is configured to detect that the mobile device unit has been removed from the interface surface based on reduced contact with the mechanical trigger.

11. The unit of claim 1, wherein the sensor circuit includes a radio frequency identification tag sensor configured to sense a radio frequency identification tag positioned on the mobile device unit, and the sensor circuit is configured to detect that the mobile device unit has been removed from the interface surface based on a signal produced by the radio frequency identification tag sensor.

12. A system for wirelessly charging a mobile device comprising:
a power receiver device configured to couple to the mobile device and receive power wirelessly for charging the mobile device;
an interface surface for the power receiver device to be positioned upon;
a power transmitter device configured to transmit power wirelessly to the power receiver device when the power receiver device is positioned upon the interface surface;
a power connector plug configured to receive external power from an external power outlet for powering the power transmitter device;
a sensor circuit configured to:
  detect when the mobile device has been positioned within a distance of the interface surface, and
  detect when the mobile device has been removed from the interface surface beyond the distance away from the interface surface;
a switch electrically coupled to the power connector plug and configured to:
  enable reception of the external power by the power connector plug from the external power outlet in response to the sensor circuit detecting that the mobile device unit has been positioned within the distance of the interface surface, and
  disable reception of power by the power connector plug from the power outlet in response to the sensor circuit detecting that the mobile device has been removed from the interface surface to the distance; and
a battery configured to power the sensor circuit when the switch has disabled the reception of the external power by the power connector plug from the external power outlet.

13. The system of claim 12, wherein the power receiver device is connected to a mobile device case for covering at least a portion of the mobile device.

14. The system of claim 12, wherein the power receiver device is configured to be positioned within the mobile device.

15. The system of claim 12, wherein the power receiver device is configured to form a magnetic resonant coupling with the power transmitter device to receive power wirelessly for charging the mobile device.

16. The system of claim 12, wherein the power transmitter device includes at least one wire, and the power receiver device includes at least one wire, the at least one wire of the power transmitter device configured to produce a magnetic field that induces a current in the at least one wire of the power receiver device to transmit power wirelessly to the power receiver device.

17. A method for wirelessly charging a mobile device unit comprising:
detecting, by a sensor circuit powered by a battery, when the mobile device unit has been positioned on an interface surface of a wireless charging unit;
automatically enabling the wireless charging unit to receive power from an external power source in response to the mobile device unit being positioned on the interface surface, the external power source being positioned external to the wireless charging unit;
charging the mobile device unit wirelessly using a power transmission device of the wireless charging unit, the power transmission device receiving power for charging the mobile device unit from the external power source;

detecting, by the sensor circuit, when the mobile device unit has been removed from the interface surface to a distance; and automatically disabling the wireless charging unit from receiving power from the external power source in response to the mobile device unit being removed from the interface surface to the distance.

\* \* \* \* \*